United States Patent [19]
Mackey

[11] 3,874,094
[45] Apr. 1, 1975

[54] PREPARATION OF SKELETAL DISPLAY OF ANIMALS

[76] Inventor: Walter J. Mackey, 1991 Sharondale Ave., St. Paul, Minn. 55113

[22] Filed: Feb. 6, 1974

[21] Appl. No.: 439,874

[52] U.S. Cl. ..................................................... 35/20
[51] Int. Cl. .......................................... G09b 23/36
[58] Field of Search......................... 35/20; 8/94.11

[56] References Cited
UNITED STATES PATENTS
2,755,165   7/1956   Lepaw ............................. 35/20 X OTHER PUBLICATIONS
R. M. Anderson, "Methods of Collecting and Preserving Vertebrate Animals," 1960, pp. 141–145.

Primary Examiner—Harland S. Skogquist

[57] ABSTRACT

A process for the preparation of animal skeletons by insect corrosion, wherein a skinned natural specimen is prepared for exposure to insects by being placed in restrained position upon a mounting base, and dehydrated by exposure to circulating air currents at a controlled temperature. After drying, the restrained specimen is placed in contact with a colony of flesh-eating insects, such as Dermestes beetles, with contact being maintained until the beetles have devoured the fleshy portions. Thereafter, the remaining skeletal specimen is cleaned and bleached, any may, if desired, be coated with an adherent and coherent transparent film.

8 Claims, 9 Drawing Figures

PREPARATION OF SKELETAL DISPLAY OF ANIMALS

BACKGROUND OF THE INVENTION

The present invention relates generally to the preparation of articulated skeletons of animals including, for example, rodents such as mice, rats, hamsters, or other mammals, as well as amphibians including frogs and toads, and reptiles such as snakes, lizards, turtles and the like. The skeleton in its final form includes the articulated skeletal structure which is mounted in generally erect position on a suitable mounting retainer. The process of the present invention makes it possible for the preparation of kits which utilize the dehydrated specimen in proper condition for exposure to flesh-eating insects such as the Dermestes beetle.

In the teaching of anatomy, biology, and other related sciences, there is a substantial need for new and more detailed anatomical teaching aids. In most academic routines, three-dimensional models have been found to be extremely helpful, and particularly models which will accurately present the various relative relationships of the skeletal structures and their individual spatial relationships. Obviously, it is always desirable to utilize skeletons of this type which are obtained from actual specimens.

The process of the present invention may be utilized to prepare skeletons from virtually any species of small mammals or reptiles which fall within the class of vertebrates having an organized or orderly constructed spinal column. Skeletons so prepared accurately represent the skeletal structure of the species inasmuch as they are obtained from the actual bodies of the individual vertebrates. Accordingly, skeletons prepared pursuant to the technique of the present invention are of significant value to those academicians engaged in the teaching of such sciences as anatomy, zoology, biology, or the like. Furthermore, the skeletons are of significant value to teaching at virtually any academic level, and may be utilized in kit form to comprise a portion of a teaching project.

Studies of animal and/or human anatomy have traditionally been either by the dissection of cadavers, the study of drawings, skeletons and textbooks, or by a study of models prepared to disclose only portions of the skeletal system. Recently, synthetic plastic or plaster models of various portions of the body structure have become available for anatomical studies, with these models, for the most part, illustrating only a general likeness to the structure which they represent. Frequently, these models are lacking in the fine structural details of the natural specimens, with these details having been found to be of great value to academicians or teachers of the anatomical sciences.

In order to properly prepare the skeletal specimen for exposure to the flesh-eating insects, it is desirable to have the specimen dehydrated while disposed in the ultimate upright mounted disposition. Controlled dehydration is conducted in order to avoid temperatures sufficiently low so that putrification may occur, or temperatures which are sufficiently high so as to destroy connective tissues. A controlled temperature of between about 125° F. and 160° F. has been found desirable for most specimens, with a temperature of approximately 140° F. being considered optimum for most purposes.

While the Dermestes beetle has been used by biologists for the removal of flesh from skeletal structures in the past, the present process makes it possible to appropriately remove flesh from skeletal structures in the classroom or laboratory. In this connection, therefore, the skeletons are prepared in such a fashion that they will retain their general standing or upright characteristics. Thus, the preparation of kits of various animals may be undertaken for use in teaching aids or the like, with the dried mounted cadavers having an extended shelf life.

SUMMARY OF THE INVENTION

In accordance with the present invention, therefore, skeletons of animal specimens are made involving the following basic steps:

1. The animal specimen is initially euthanized;
2. The euthanized specimen is pre-positioned on a supporting base, with the structure being restrained in an upright, standing or erect position and disposed upon a suitable mounting base;
3. The specimen is dehydrated by slow drying at a temperature of between 125° F. and 160° F.;
4. The thus processed specimen is then ready for introduction to the flesh-eating insects such as the Dermestes beetle; and
5. The corroded specimen is then removed from contact with the insects, at which time it is cleaned, bleached and dried. The specimen may thereafter be placed in its ultimate display container.

Therefore, it is a primary object of the present invention to provide an improved process for the preparation, mounting and drying of small mammals and reptiles for ultimate exposure to flesh-eating insects, and for the preparation of standing articulated skeletons.

It is a further object of the present invention to provide an improved technique for the preparation of natural skeletons of animals wherein the specimen is placed in a restrained upright position upon a mounting base, and dehydrated under controlled conditions for preparation to exposure to flesh-eating insects.

It is yet a further object of the present invention to provide an improved technique for the dehydration of euthanized animal specimens wherein the dehydration is undertaken while the specimen is maintained in restrained disposition upon a mounting base, preparatory to exposure of the specimen to corrosion techniques, specifically corrosion by flesh-eating insects.

Other and further objects of the present invention will become apparent to those skilled in the art upon a study of the following specification, appended claims, and accompanying drawing.

DESCRIPTION OF THE PREFERRED EMBODIMENT

In order to best disclose the process of preparing skeletons pursuant to the present invention, the following technique is described in detail. This technique is directed to the preparation of a skeleton of a rodent, specifically a rat, with the process being appropriate for other small mammals and rodents as well.

EUTHANASIA AND SKINNING OF ANIMAL

The animal is initially euthanized with an overdose of ether. In order to accomplish this, the animal is placed in a small enclosed container with a pledget of cotton soaked in ether, whereupon the animal will expire in less than about 5 minutes.

Using a tissue scissors to slit the skin in the ventral midline from the chin to the tip of the tail, the skin in cut away from the incision laterally to the tip of each limb. By manual traction and snipping of tissues with the tissue scissors, the entire skin is removed from the animal. The skin is also pulled off the end of each paw. In this operation, care is required in order to avoid fracture of bones or cutting of ribs. Following skinning, all intestinal and thoracic viscera is removed.

CONSTRUCTION OF BASE MOUNTING BOARD

Figure 3:
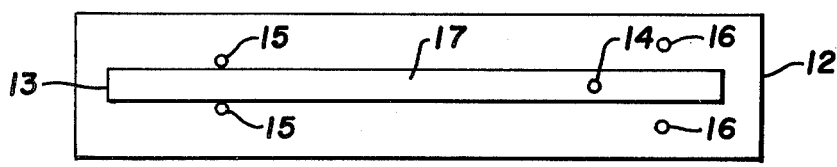
FIGS. 3, 4 and 5 are top plan, side elevational, and front elevational views respectively of the mounting base or restraint pad utilized for the specimen illustrated in FIG. 2.
Figure 4:
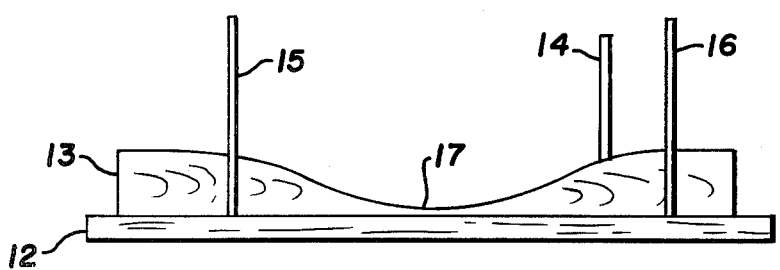
Figure 5:
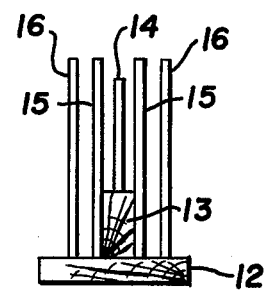
Figure 6:
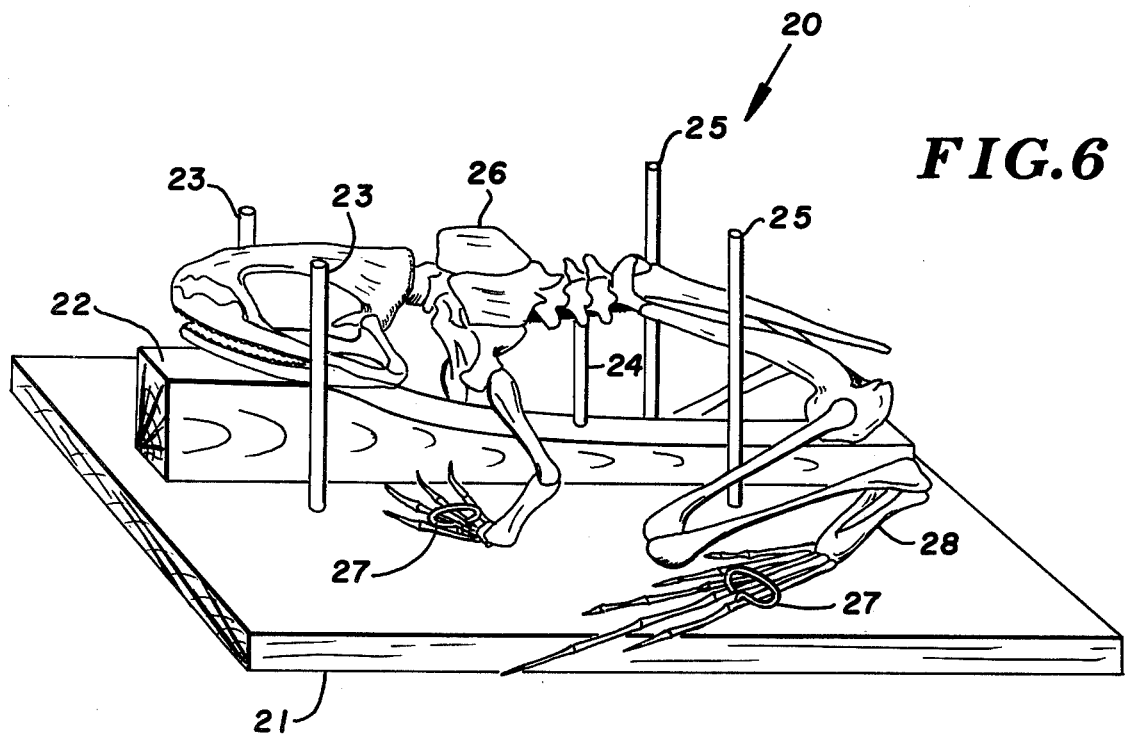
FIG. 6 is an isometric view of a dehydrated reptile specimen shown mounted on a modified base and in the disposition prior to introduction to the flesh-eating Dermestes beetles.
Figure 7:
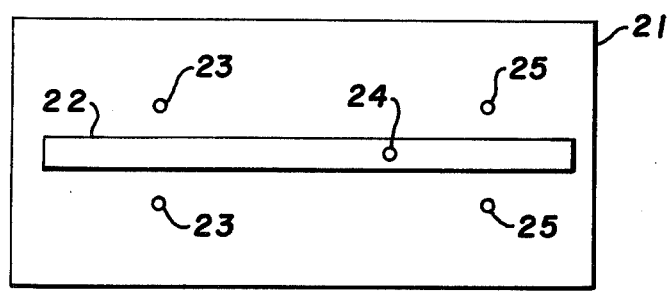
FIGS. 7, 8 and 9 are top plan, site elevational, and front elevational views respectively of the mounting base or restraint pad utilized for the reptile specimen illustrated in FIG. 6.
Figure 8:
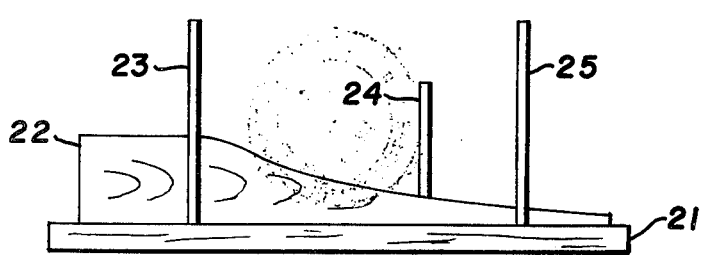
Figure 9:
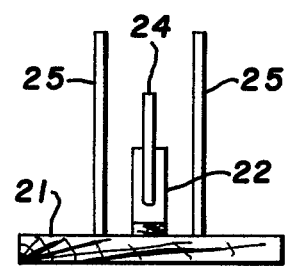

With particular attention being directed to FIGS. 3, 4 and 5 of the drawing, the base mounting board is provided utilizing soft wood of ¼ inch thickness. Specifically, a base 12 is provided having a support rail 13 mounted thereon, and with support posts 14, 15—15 and 16—16 being provided. A recess zone is provided as at 17 to receive and otherwise support the skeleton. This mounting base permits and facilitates handling of the specimen during the entire process, as well as to immobilize and properly position the specimen during the drying process. The support arrangement prevents loss of component parts during washing, chemical corrosion, and bleaching processes.

POSITIONING THE SKINNED SPECIMEN ON THE BASE MOUNTING BOARD

The specimen is initially positioned in the normal erect position, such as the normal standing position, with the heat erect and the tail around to one side. The specimen must be securely restrained in this position by the combined upright wooden pegs or pins. In this position, one such pin is provided on each side of the anterior neck area, such as the pins 15—15, with an additional pin being provided to support the lumbar area, such as pin 14. Additional pins, such as pins 16—16, may be utilized, if desired, for prevention of lateral motion of the pelvis. Thereafter, each paw is secured to the base plate by a tack or the like. In this restrained position, the specimen may be exposed to the various subsequent steps of drying, corrosion, and bleaching.

DRYING

The animal specimen which has been mounted on the base plate is placed in a drying oven in order to become thoroughly dehydrated. The drying process may take from between 3 days to 14 days, depending upon the size of the species and the conditions of the drying oven. The drying oven is maintained at a temperature of from between 125° F. up to 160° F., with adequate circulation of air being provided during this drying process. It has been found that an oven temperature below 125° F. causes partial putrification of the specimen, and thus is undesirable, while a temperature of over about 160° F. destroys certain connective tissues. Upon becoming completely dehydrated, the specimen and muscular tissues are resistant to putrifactive breakdown, and are generally mechanically hard and firm, and will not yield to ordinary mechanical shock and pressure.

INSECT CORROSION

A colony of Dermestes beetles is employed for insect corrosion, with these beetles being placed into the corrosion box with the dried specimen, along with a covering of wood chips and a supply of water. For best results, and for proper control of the corrosion operation, the corrosion is undertaken in a plastic corrosion box.

For best results, the corrosion box is kept in a warm room with a quantity of water being added to a cotton wad each day. The beetle colony will grow and multiply in number and in a period of approximately 6 weeks, will completely corrode away the normal flesh from the specimen and leave an intact standing skeleton.

CHEMICAL CLEANING OF CORRODED SPECIMEN

The specimen is gently removed from the corrosion box and beetle colony, and rubber bands may be placed across the wooden pins on either side of the skeleton in order to assist in retaining the structure unitary in form. The skeleton is then immersed in an undiluted solution of sodium hypochlorite (5 percent) for a period of approximately 1½ minutes. Undiluted solutions of sodium hypochlorite are, of course, commercially available as household bleach. This solution will chemically remove any of the remaining bits of tissue and other debris which may remain on the skeleton. Following exposure to the sodium hypochlorite solution the skeletal remains are rinsed in water.

BLEACHING

In order to bleach the skeleton, it is immersed in a 3 percent solution of hydrogen peroxide for a period of about 24 hours, and thereafter again rinsed.

DEGREASING

The skeleton may contain quantities of fat which may be removed upon immersion in a strong detergent solution such as, for example, a substantially concentrated solution of trisodium phosphate. Several hours of exposure are normally sufficient, and thereafter, the skeleton is again rinsed.

FINAL DRYING

Figure 1:
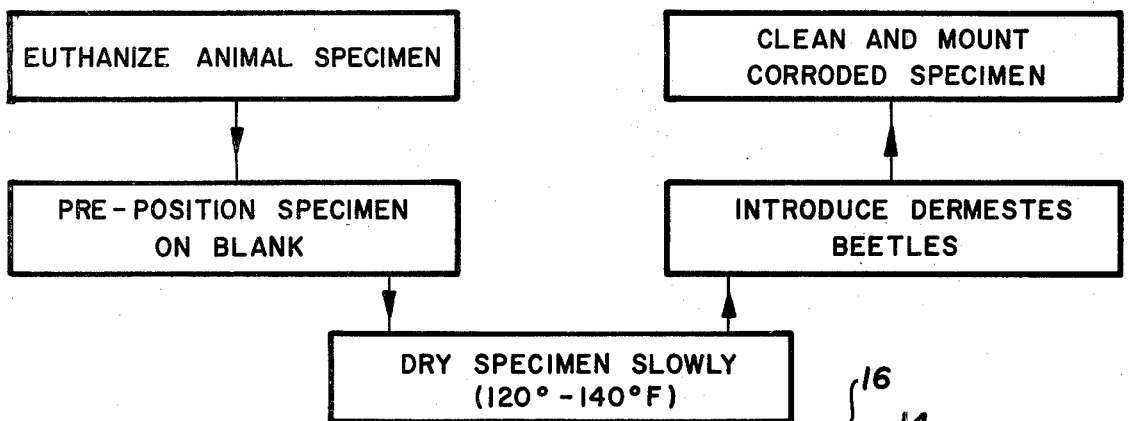
FIG. 1 is a flow diagram illustrating the various basic steps involved in the preferred process of the present invention.
Figure 2:
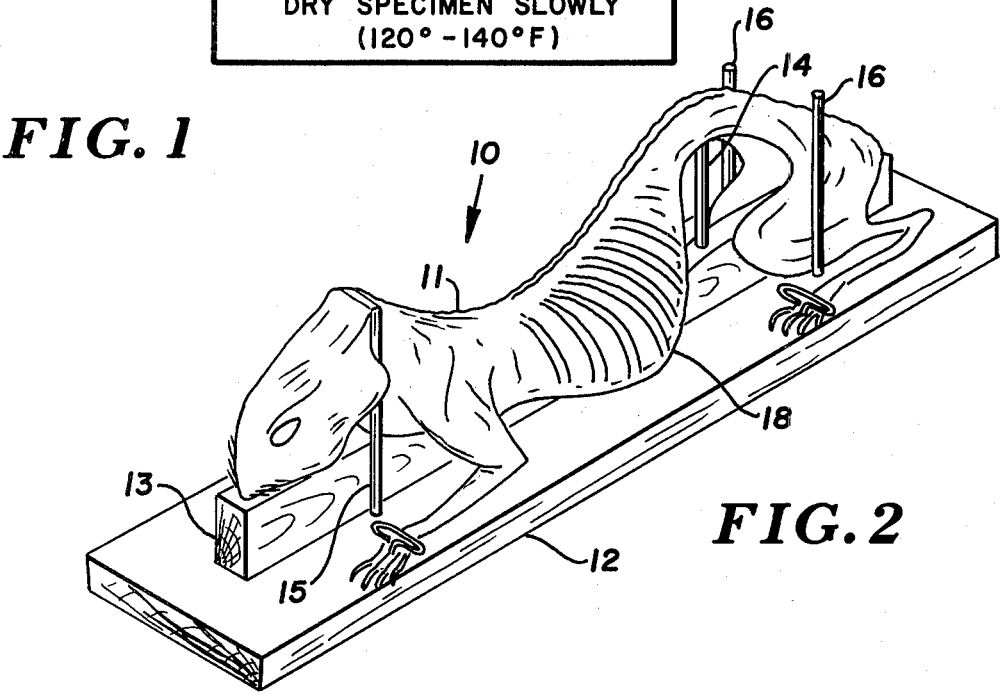
FIG. 2 is an isometric view of the dehydrated mammal specimen prior to introduction to the flesh-eating Dermestes beetles.

Following these steps, the specimen is clean and somewhat flexible. The cleaned specimen is then dried thoroughly in a standing position as shown in FIG. 2 of the drawing, and is maintained in this position until dry and firm. This drying may normally be accomplished in conventional ambient room conditions, but may be accelerated if undertaken in the sunlight or in front of an air-moving structure such as a fan or the like. Normally, drying is completed in 72 hours, again depending upon the size of the specimen. Normal rodents such as rats are sufficiently dry in 72 hours. Thereafter, any bones or joints which may have become loosened during the operation should be restored by adhesively coupling the bones or joints in proper position, particularly after the specimen is fully dried.

SPRAY COATING OF SPECIMEN

The skeleton may thereafter be sprayed with a suitable number of coats of clear acrylic plastic which is commercially available in an aerosol spray can. One such spray is clear acrylic plastic spray, such as Krylon under the Code number 1301.

MOUNTING THE SKELETON IN FINAL DISPOSITION

The final step in preparing the skeletal specimen is the removal of the skeleton from the wooden base plate and the securing of the skeleton to its ultimate display box or base. For a skeleton of a rat, it is merely necessary to cement each of the feet to the surface of the final display base.

Attention is now directed to the devices illustrated in FIGS. 6-9 inclusive, particularly wherein a skeleton of a frog is illustrated in restrained disposition on a somewhat modified form of mounting pad. In this embodiment, the structure generally designated 20 includes a mounting pad 21 having a support rail 22 mounted thereon, and with support posts 23—23, 24 and 25—25 disposed thereon. A skeleton of a frog is shown at 26, with the individual foot elements being secured to the surface of the base 21 by means of tacks or the like as shown at 27—27.

The posts 23—23 are used to laterally hold or retain the head portion, while the spinal column is supported as at 24. The pelvis is disposed inwardly of the restraining pins 25—25, while these pins further provide an outside restraint for the limbs as at 28.

As has been indicated, the general procedure followed in the preparation of the skeleton is the same as that described above in connection with the rat, with the drying time, of course, being somewhat shorter because of the smaller size of the specimen.

GENERAL COMMENTS

As has been indicated, temperatures of from between about 125° F. and 160° F. are preferred for drying or dehydrating the animal, and for most conventional specimens, such as adult rats or the like, a temperature of 140° F. for 6 days has been found proper. This exposure provides the ideal dried specimen for the exposure to flesh-eating insects.

In the insect corrosion of the body, the colony of Dermestes beetles, generically known as Dermestes vulpirus, are placed within a layer of approximately 1-inch of sawdust or wood chips, preferably along the bottom of the box containing the colony. Moisture is provided for the colony by providing a quantity of cotton which is moistened from time to time in order to maintain the beetle colony active and viable.

The working colonies are preferably maintained in a darkened room as the insects have been found to work more rapidly in the dark. The room is maintained at normal conditions and normal relative humidity. Preferably, the specimen is examined daily in order to note the progress of flesh removal and in order to avoid over-corroding or disarticulation of the specimen. As the joints and other connective items between the bones begin to appear on the specimen, care should be taken to controllably note the the progress, since connective tissues including ligaments and the like are removed following consumption of the muscular and fatty tissues. Care must be taken to remove the specimen from the colony at the proper time. As indicated, a period of approximately 6 weeks provides desirable results for essentially any corrosion operation.

While fat removal has been described above, utilizing strong detergent solutions, carbon tetrachloride or other degreasing solutions may be utilized in a separate operation, following the fat removal. Appropriate precautions should, of course, be taken for using carbon tetrachloride or other degreasing materials.

I claim:

1. The method of preparing natural skeletons for insect corrosion of an animal specimen which includes the steps of:
   a. euthanizing the animal specimen;
   b. removing the skin layer from the euthanized animal specimen and placing the skinned specimen in a restrained position upon a mounting base; and
   c. dehydrating the specimen at a temperature of from between about 125° F. up to 160° F. for a period of from about 3 to 14 days.

2. The method as defined in claim 1 being particularly characterized in that said dehydration is undertaken at a temperature of approximately 140° F. for a period of 6 days.

3. The method as defined in claim 1 being particularly characterized in that said restrained position is a normal erect position for the animal specimen.

4. The method as defined in claim 1 being particularly characterized in that dehydration occurs in an enclosure having a circulating atmosphere.

5. The method as defined in claim 1 being particularly characterized in that the dehydrated specimen is exposed to a colony of Dermestes beetles, with the specimen being exposed to said colony until the flesh is substantially entirely removed from the restrained specimen.

6. The method as defined in claim 5 being particularly characterized in that following said exposure to the colony of Dermestes beetles, the animal specimen is immersed in an aqueous solution of sodium hypochlorite.

7. The method as defined in claim 5 being particularly characterized in that the corroded specimen is immersed in an aqueous solution of sodium hypochlorite, and thereafter immersed in an aqueous solution of hydrogen peroxide until the surface becomes bleached.

8. The method as defined in claim 5 being particularly characterized in that said corroded specimen is removed from said beetle colony and residual fatty tissue is removed by immersion in an aqueous detergent solution.

* * * * *